United States Patent [19]

Spagnoli et al.

[11] Patent Number: 5,304,581
[45] Date of Patent: Apr. 19, 1994

[54] PROCESS FOR MOLDING MICROCELLULAR ELASTOMERIC POLURETHANE ARTICLES AND MICROCELLULAR ELASTOMERIC POLYURETHANES THEREFOR

[75] Inventors: Maurizio Spagnoli; Elio Scarnato, both of Cremona, Italy

[73] Assignee: C.O.I.M. Chimica Organica Industriale Milanese S.p.A., Milan, Italy

[21] Appl. No.: 915,686

[22] PCT Filed: Sep. 21, 1991

[86] PCT No.: PCT/EP91/01803
§ 371 Date: Jul. 24, 1992
§ 102(e) Date: Jul. 24, 1992

[87] PCT Pub. No.: WO92/11305
PCT Pub. Date: Jul. 9, 1992

[30] Foreign Application Priority Data

Dec. 24, 1990 [IT] Italy .................................. 22534 A/90

[51] Int. Cl.$^5$ .............................................. C08G 18/14
[52] U.S. Cl. ........................................ 521/159; 521/51
[58] Field of Search ................................... 521/159, 51

[56] References Cited

U.S. PATENT DOCUMENTS

| | | | |
|---|---|---|---|
| 4,190,711 | 2/1980 | Zdrahala et al. | 521/112 |
| 4,334,032 | 6/1982 | Patton, Jr. et al. | 521/115 |
| 4,559,366 | 12/1985 | Hostettler | 521/51 |
| 4,686,242 | 8/1987 | Turner et al. | 521/137 |
| 4,791,148 | 12/1988 | Riley et al. | 521/159 |

*Primary Examiner*—Maurice J. Welsh
*Attorney, Agent, or Firm*—Fitzpatrick, Cella, Harper & Scinto

[57] ABSTRACT

A novel, particularly flexible, improved process for molding microcellular elastomer polyurethane articles comprises reacting a first type quasi-polyurethane, having a molecular weight of from 600 to 2200 and a free isocyanate group percent content of from 14 to 3.8, with at least one of a second type of quasi-polyurethane, having a molecular weight of from 3000 to 8000 and a free hydroxyl group percent content of from 1.13 to 0.48, and a glycol and optionally in the presence of water. The process according to the invention is particularly well-suited for automation by means of a processor. Also, the preparation of certain microcellular elastomer polyurethanes that are useful in the improved molding process is described.

9 Claims, No Drawings

PROCESS FOR MOLDING MICROCELLULAR ELASTOMERIC POLURETHANE ARTICLES AND MICROCELLULAR ELASTOMERIC POLYURETHANES THEREFOR

The instant invention relates to a novel process for molding articles of microcellular elastomeric polyurethane (hereinbelow indicated, for the sake of brevity, simply as M.E.P.). More particularly, the instant invention relates to a particularly flexible process for molding a microcellular elastomeric polyurethane.

It is an object of the instant invention to provide a molding process which allows one to make a wide range—from the point of view of the physico-mechanical characteristics—of M.E.P. articles without the need for changing or substituting the starting materials.

Another object of the instant invention is that of providing a process for making M.E.P.s particularly suitable for said molding process, in which starting materials are employed having a well defined composition.

A further object of the instant invention is that of providing a process for molding M.E.P. articles wherein the reaction for producing the polyurethane is driven in a step preceding the molding of the article in order to form bases with a controlled and stable structure.

A further object yet of the instant invention is that of providing a process for molding M.E.P. articles which allows one to make M.E.P.s having different physico-mechanical characteristics, only by means of cross-linking agents.

Another important object of the instant invention is to provide a process for molding M.E.P. articles which can be automated by means of a processor.

These objects and others yet will be more clearly illustrated by the description hereinbelow.

As it is known, M.E.P. is generally made by reacting stoichiometric quantities of a polyol and of a prepolymer.

Practically, said reagents are taken from tanks and conveyed to the mixing heads by means of dosing pumps. The blending takes place as a result of the rapid increase of the flow speed of the materials introduced into the head, where they flow into one only zone of relatively limited dimensions so that there is a very high probability that the molecules of both of the reagents and of the catalyst may interact thereby producing a reaction product that is sufficiently homogeneous notwithstanding the very high reaction speed. However, for economic reasons, very short withdrawal times are demanded in the industrial process, and, hence, it is necessary to use considerable quantities of catalysts which, by remaining within the finished article, cause the deterioration of the latter's physico-mechanical characteristics.

Furthermore, since the polyols used for making M.E.P. do not consist of single components but instead of mixtures of different components, some of which are hardly or not at all soluble, this gives rise to the drawback of having to subject the polyol mixtures to homongenization before use. These polyol mixtures must also be constantly stirred during their use.

A further inconvenience of the state of the art processes lies in the fact that the quantity of reagents to be stocked for the molding process must not only be proportional to the quantity to be worked, but also to the type of article to be made. This necessitates the interruption of the production to allow for changing or modifying one or both reagents (polyol, isocyanate) and/or the catalyst. These changes and/or modifications, besides lowering productivity, cause the loss of starting materials and involve the use of solvents for washing the tanks and equipment. Last but not least, said changes and/or modifications almost always demand the re-adjustment of the operating conditions of the plant with the consequent problems of adjusting the production to the market requirements.

Evident are the shortcomings of the state of the art processes from what has briefly been described hereinabove.

Consequently, the object of the instant invention is that of providing a process for molding M.E.P. articles, that does not present the shortcomings of the processes known from the state of the art. It has now been found that when using strictly defined compounds (hereinafter called quasi-polyurethanes or, in short: Q-PUR), as the starting materials, instead of prepolymers and polyols, it is possible to make M.E.P. articles having the specific gravity, surface hardness, elasticity, compressive strength and abrasion resistance of which can be modified by acting exclusively on the quantity of the starting materials.

According to the process of the instant invention, the basic components are polymerized to the highest degree compatible with the molding plant. Thus Q-PURs are obtained by means of strictly timed reactions and not by random blending in the mixing head.

More precisely, the inventive process provides the use—instead of a prepolymer and of a polyol (which, as is known, is in actual fact a mixture of several polyols, sometimes of a not strictly defined composition)—of two bases or Q-PURs which not only do not contain foreign materials, be they dissolved or not, such as solvents or fillers of various kind, but they have a strictly defined chemical composition.

The first of these bases consists of a quasi-polyurethane (Q-PUR-1) with a molecular weight of between 600 and 2200, preferably between 650 and 1500 and even more, preferably between 700 and 1100, and a percentage of free isocyanate (—NCO) groups of between 14 and 3.8, preferably between 12.9 and 5.6 and even more preferably between 12 and 7.6. The second base consists of a quasi-polyurethane (Q-PUR-2) having a molecular weight of between 3000 and 8000, preferably between 3500 and 5000 and even more preferably between 3750 and 4500 and with a percentage of free hydroxyl (—OH) groups of between 1.13 and 0.48, preferably of between 0.97 and 0.68 and even more preferably between 0.9 and 0.75.

In the blending step, the free —NCO groups of Q-PUR-1 are saturated with aqueous glycol solutions and glycol/catalyst solutions so as to make polyurethane polymers of different specific weight.

The chemical structure of the M.E.P. is modified, according to the process of the instant invention, by means of Q-PUR-2. More precisely, said chemical structure varies in proportion to the quantity of Q-PUR-2 employed.

According to the instant invention, the isocyanates and the resins are reacted in a vessel according to per se known processes which enable controlling the reaction in such a manner as to attain a regular distribution of the molecular weights.

In the course of the molding step, the glycol develops its chain-lengthening and cross-linking activity. In turn, the Q-PUR-2 (which at each extremity of the molecule has a free hydroxyl group) reacts with the Q-PUR-1, via the latter's free isocyanate groups, in order to form a longer straight chain. In this manner the inner plasticizing of the polymer structure is achieved.

The skilled artisan will immediately appreciate the advantage of using an inner rather than an external, i.e. an heterogeneous-phase plasticizing process as that which occurs when conventional (reactive or inert) plasticizers are used. Hence this is a further advantage offered by the process according to the instant invention.

As already mentioned hereabove, the Q-PUR-1s, suitable for the process according to the instant invention, preferably have a molecular weight of between 600 and 2200, preferably between 650 and 1500 and even more preferably between 700 and 1100 and a percentage of free isocyanate groups ranging between 14 and 3.8, preferably between 12.9 and 5.6 and even more preferably between 12 and 7.6. This polyurethane resin of the instant invention is preferably made by reacting a diphenylmethane diisocyanate with a saturated polyester, such as e.g. glycol adipate, having a molecular weight of between 1500 and 2500.

The Q-PUR-1 constitutes the basic component for the M.E.P. formulation and, contrary to what happens with conventional polymers, by saturating the isocyanate groups with glycols the whole cross-linking process of the system is completed, the final characteristics of which are predetermined by the type of saturated polyester used, by the molecular weight of Q-PUR-1 as well as by the type of glycol used. The reaction is catalyzed with triethylene diamine and the specific weight is determined by the water content.

On the other hand, Q-PUR-2 consists of a polyurethane resin having a molecular weight ranging between 3000 and 8000, preferably between 3500 and 5000 and even more preferably between 3750 and 4500, containing a percentage of free hydroxyl groups ranging between 1.13 and 0.48, preferably between 0.97 and 0.68, and even more preferably between 0.9 and 0.75. Preferably, this resin is made by reacting, according to per se known methods, diphenylmethane diisocyanate with a saturated polyester having a molecular weight of 1500 to 2500, in the molar ratio of 1:2.

The Q-PUR-2 thus obtained constitutes the component capable of controlling the M.E.P. characteristics. As already mentioned one of the main advantages of the inventive process is represented by its flexibility. In fact, as shown in the Table below herebelow, depending upon how the various components are combined, it is possible to obtain molecular structures that differ very much from each other, so much so that end products can be obtained having completely different physico-mechanical characteristics relative to each other. It should not be overlooked that inside each main group it is possible to arrange for one of the physico-mechanical characteristics to prevail over another one.

TABLE 1

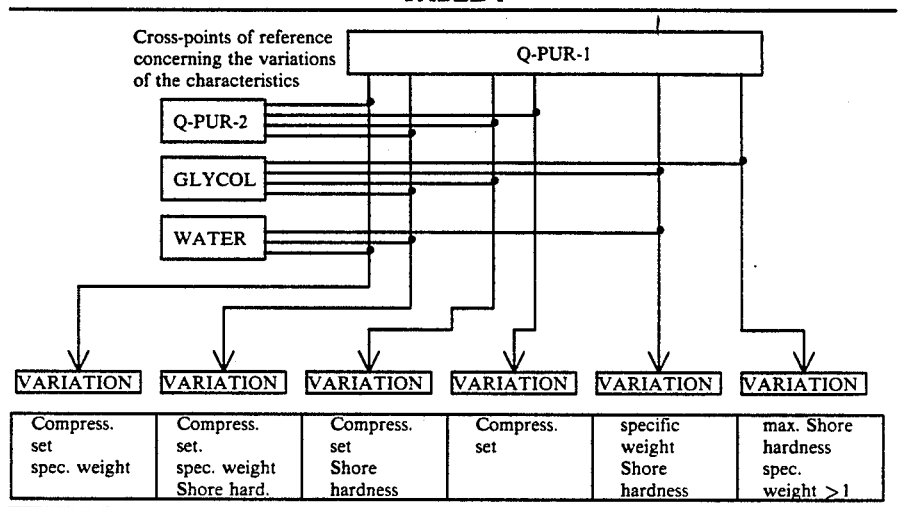

| Compress. set spec. weight | Compress. set. spec. weight Shore hard. | Compress. set Shore hardness | Compress. set | specific weight Shore hardness | max. Shore hardness spec. weight >1 |
|---|---|---|---|---|---|

Considering that the reaction partners useful for the instant invention are all strictly defined materials as far as their chemical compositions are concerned, the inventive process particularly lends itself to automation using a processor.

After having generally outlined the process according to the instant invention, it will now be better illustrated by way of some working examples which, for the sake of brevity, do not contemplate all of the starting materials or the possible reactive combinations thereof. This fact, however, shall not constitute a limitation of the scope of protection of the instant invention inasmuch—as appears evident to the skilled artisan—the forms of embodiment of the process according to the instant invention can vary widely, be it with regard to the starting materials as to the reaction conditions, so as to adapt them to the specific circumstances.

Once the skilled artisan has become acquainted with the fundamental principles on which the present process is based, he will have no difficulty whatsoever in adapting the parameters of the process so as to attain the M.E.P. having the desired characteristics, without thereby departing from the spirit of the invention.

EXAMPLE 1

Preparation of a quasi-polyurethane using free—NCO groups (Q-PUR-1)

A 10,000 liter steel reaction vessel provided with stirrer, thermoregulator and suitable device for providing an inert environment, is fed with 3751 kg MDI (diphenylmethane diisocyanate) at a temperature of 38° to 42° C. under stirring and in a dry nitrogen environment, to which is added 3,748 kg saturated polyester resin (made by reacting adipic acid with monoethylene glycol of m.w.=1500, containing a percentage of water lower than 0.1 and with an acid number lower than 1 (AN<1). This resin, at a temperature of 80° C., is fed to the MDI mass through a line (at the extremity of which is an anti-bubbling continuous flow device) dosed at a flow rate of 70–80 l/min by means of a metering pump.

Since the reaction is exothermic, the temperature of the reaction mass tends to increase, which must therefore be cooled so as not to exceed 90° C. After the addition of the resin has been completed, the reaction mass is stirred for 2 hours, between 85° and 90° C., taking care that the atmosphere is saturated with nitrogen. The reaction has been completed once the following values have been obtained:
free—NCO: 14%
molecular weight: 600

EXAMPLES 2 to 7

By operating in like manner to what is described in Example 1 but using the reagents indicated quali/quantitatively in the Table hereinbelow, are prepared the Q-PUR-1s having the characteristics as shown.

TABLE 2

| | MDI kg | RESIN kg | RESIN (*) | RESIN (mol · weight) | %-NCO (final) | MOL · WEIGHT (final) |
|---|---|---|---|---|---|---|
| 2) | 3280 | 4219 | monoeth.glycol/diethylene glycol | 1750 | 12 | 700 |
| 3) | 2499 | 5000 | diethylene glycol ↓ butane diol | 2000 | 8.4 | 1000 |
| 4) | 1748 | 5751 | ↓ butane diol | 2500 | 5.25 | 1600 |
| 5) | 1532 | 5967 | ↓ butane diol moneth.glycol | 3000 | 4.66 | 1800 |
| 6) | 1322 | 6177 | diethylene glycol monoeth.glycol/trimethylol propane | 4000 | 4.2 | 2000 |
| 7) | 1104 | 6395 | diethylene glycol trimethylol propane | 5000 | 3.8 | 2200 |

(*) Note: "RESIN" stands for a polyester resin made from adipic acid and the respectively indicated alcohol.

EXAMPLE 8

Preparation of a quasi-polyurethane using free—OH groups (Q-PUR-2)

A 10,000 liter steel reaction vessel provided with stirrer, thermoregulator and suitable device for providing an inert environment, is fed with 8,000 saturated polyester resin (made by reacting, at a temperature of 120° C., adipic acid with monoethylene glycol having a m.w.=1500, containing a percentage of water lower than 0.1 and an AN<1). Under stirring and in a dry nitrogen environment is then added, very cautiously, 613 kg MDI, at a temperature of 38° to 42° C., while the flow capacity of the metering pump must not exceed 8 l/min; the blades of the stirrer must not thrust the MDI against the walls of the reaction vessel.

The environment must be carefully controlled and secured throughout the entire reaction. After the addition has been completed, the reaction mass is left to cool down to 60° C., still under stirring. The reaction has been completed once the following values are obtained:
free—OH: 1.13%
molecular weight: 3000.

EXAMPLES 9 to 14

By operating in like manner to what is described in Example 8 but using the reagents indicated quali/quantitatively in the Table hereinbelow, are prepared the Q-PUR-2s having the characteristics as shown.

TABLE 3

| | MDI kg | RESIN kg | RESIN (*) | RESIN (mol · weight) | %-OH (final) | MOL · WEIGHT (final) |
|---|---|---|---|---|---|---|
| 9) | 571 | 8000 | monoeth.glycol/diethylene glycol | 1750 | 0.9 | 3750 |
| 10) | 500 | 8000 | diethylene glycol ↓ butane diol | 2000 | 0.8 | 4250 |
| 11) | 342 | 8000 | ↓ butane diol | 2500 | 0.75 | 4500 |
| 12) | 266 | 8000 | ↓ butane diol monoeth.glycol | 3000 | 0.68 | 5000 |
| 13) | 181 | 8000 | diethylene glycol monoethy.glycol/trimethylol propane | 4000 | 0.56 | 6000 |
| 14) | 95 | 8000 | diethylene glycol trimethylol propane | 6000 | 0.48 | 7000 |

(*) NOTE: "RESIN" stands for a polyester resin made from adipic acid and the respectively indicated alcohol.

In Examples 1 thru 14 a polyester has always been employed. However, it is possible to use instead a polyether made—as is known to the skilled artisan—by polymerizing propylene oxide with monoglycols or polyglycols containing one or more reactive hydrogen atoms.

Generally, it has been found that the use of polyethers yields Q-PUR-1 and Q-PUR-2 having the same molecular weight, yet that are considerably less viscous than the corresponding quasi-polyurethane originating from a polyester and, hence, having improved workability. At any rate, the choice depends on the physico-mechanical characteristics of the quasi-polyurethane desired.

EXAMPLES 15 TO 17

Preparation of the "catalyst-foaming agent" solutions

Herebelow is given the composition (the parts are expressed in percent) of three typical solutions having catalytic, chain lengthening an foaming activity, useful for the process of the instant invention for affecting the reaction velocity and/or physico-mechanical characteristics of the M.E.P.

| COM-PONENT | SOLUTION 1 (catalyst) | SOLUTION 2 (chain lengthener) | SOLUTION 3 (foaming agent) |
|---|---|---|---|
| Monoethylene glycol | 70 | 100 | 70 |
| Dabco | 30 | 0 | 0 |
| Water | 0 | 0 | 30 |
| % Total | 100 | 100 | 100 |

The preparation of these solutions does not demand particular procedures, however the temperature must be kept at about 60° C. and precaution must be taken to operate in a moisture-free environment.

Dabco, as is known to the skilled artisan, is triethylene diamine.

The molding of M.E.P. according to the inventive process is illustrated in the Examples that follow.

Into a mixing head are fed all the reaction partners:
Q-PUR-1 (base 1)
Q-PUR-2 (base 2)
SOLUTION 1 (catalyst)
SOLUTION 2 (chain lengthener)
SOLUTION 3 (foaming agent)

The tanks containing the bases 1 and 2 are thermoregulated at a temperature of 50°-60° C. and provided with a moisture trap.

A gear pump, having a volume proportional to the quantity of product mass used per unit of time, maintains the base (1 or 2) in continuous and constant circulation between the tank and the mixing head.

The tanks containing the additives are thermoregulated at a temperature of 20°-30° C. and provided with moisture traps.

In this case too it will be a gear pump, yet having a volume twenty times lower than the previously cited one, that keeps the recycling in the head.

The flow rate of all these pumps is governed by a manager program of the molding cycle. The program, stored in a processor's memory, stabilizes, according to demand, the quantities of the various partners which take part in the reaction.

Shortly before injection, the speed of the motors connected to the pumps is adjusted by the processor's interfaced control cards to the r.p.m.s necessary for the specific situation. At the command "START-INJECTION" only the valves open up that correspond to the materials that have to take part in the reaction producing that given type of polyurethane. The valves remain open so as to interrupt recycling and to feed the reaction partners into the mixing zone for the time required to fill the mold.

The products crossing the mixing zone come into close contact through the use of a mechanical impeller.

The ejection from the head occurs through an orifice at the extremity of the head itself.

Once the injection is finished, the dedicated software redirects the output according to the program and the cycle continues, allowing for the production of a continuously differentiated series of M.E.P.

EXAMPLE 18

An M.E.P. of low specific gravity, having sufficient compressive strength to permit its use for producing shoe bottoms, is now exemplified.

| DOSAGE OF THE COMPONENTS: | |
|---|---|
| | flow rate (g/s) |
| SOLUTION 1 - Catalyst | 0.32 |
| SOLUTION 3 - Foaming Agent | 0.26 |
| SOLUTION 2 - Chain Lengthener | 2.75 |
| | 3.33 |
| BASE 1 | 45.50 |
| BASE 2 | 0.00 |
| TOTAL BASES | 45.50 |
| TOTAL FLOW RATE | 48.83 |

This M.E.P. has the following chemical composition:

| MDI | 35.50 |
|---|---|
| Polyester 1 | 57.67 |
| Polyester 2 | 0.00 |
| MEG (*) | 6.47 |
| Dabco | 0.20 |
| Water | 0.16 |
| TOTAL | 100.00 |

EXAMPLE 19

An M.E.P. of low specific weight, with such characteristics of softness as to permit its use for producing innersoles for footwear, is now exemplified:

| DOSAGE OF THE COMPONENTS: | |
|---|---|
| | flow rate g/s |
| SOLUTION 1 - Catalyst | 0.23 |
| SOLUTION 3 - Foaming Agent | 0.37 |
| SOLUTION 2 - Chain Lengtherener | 0.01 |
| Total Additives | 0.61 |
| BASE 1 | 13.65 |
| BASE 2 | 14.74 |
| TOTAL BASES | 28.39 |
| TOTAL FLOW RATE | 29.00 |

This M.E.P. has the following chemical composition:

| MDI | 20.93 |
|---|---|
| Polyester 1 | 29.14 |
| Polyester 2 | 47.83 |
| MEG (*) | 1.48 |
| Dabco | 0.24 |
| Water | 0.38 |
| TOTAL | 100.00 |

EXAMPLE 20

An M.E.P., with specific gravity greater than 1, very resilient, particularly suitable for producing anti-slip surfaces exposed to climatically critical environments (temperatures between −20° and −50° C.), is now exemplified.

| DOSAGE OF THE COMPONENTS: | flow rate (g/s) |
|---|---|
| SOLUTION 1 - Catalyst | 0.14 |
| SOLUTION 3 - Foaming Agent | 0.00 |
| SOLUTION 2 - Chain Lengthener | 0.72 |
| Total additives | 0.86 |
| BASE 1 | 13.65 |
| BASE 2 | 14.74 |
| TOTAL BASES | 28.39 |
| TOTAL FLOW RATE | 29.25 |

This M.E.P. has the following chemical composition:

| MDI | 20.75 |
|---|---|
| Polyester 1 | 28.90 |
| Polyester 2 | 47.43 |
| MEG (*) | 2.78 |
| Dabco | 0.14 |
| Water | 0.00 |
| TOTAL | 100.00 |

EXAMPLE 21

An M.E.P., with specific gravity greater than 1, very stiff, particularly suitable for being worked with machine tools and cut into slabs, cylinders, and so forth, is now exemplified.

| DOSAGE OF THE COMPONENTS: | flow rate (g/s) |
|---|---|
| SOLUTION 1 - Catalyst | 0.28 |
| SOLUTION 3 - Foaming Agent | 0.00 |
| SOLUTION 2 - Chain Lengthener | 3.23 |
| Total additives | 3.51 |
| BASE 1 | 45.50 |
| BASE 2 | 0.00 |
| TOTAL BASES | 45.50 |
| TOTAL FLOW RATE | 49.01 |

This M.E.P. has the following chemical composition:

| MDI | 35.37 |
|---|---|
| Polyester 1 | 57.47 |
| Polyester 2 | 0.00 |
| MEG (*) | 6.99 |
| Dabco | 0.17 |
| Water | 0.00 |
| TOTAL | 100.00 |

EXAMPLE 22

An M.E.P., specifically produced for making the soles of sport shoes that require particular stress resistance properties, is now exemplified.

| DOSAGE OF THE COMPONENTS: | flow rate (g/s) |
|---|---|
| SOLUTION 1 - Catalyst | 0.23 |
| SOLUTION 3 - Foaming Agent | 0.19 |
| SOLUTION 2 - Chain Lengthener | 1.64 |
| Total additives | 2.06 |
| BASE 1 | 29.57 |
| BASE 2 | 7.37 |
| TOTAL BASES | 36.94 |
| TOTAL FLOW RATE | 39.00 |

This M.E.P. has the following chemical composition:

| MDI | 30.01 |
|---|---|
| Polyester 1 | 46.95 |
| Polyester 2 | 17.78 |
| MEG (*) | 4.95 |
| Dabco | 0.18 |
| Water | 0.14 |
| TOTAL | 100.00 |

The M.E.P.'s that can be made with the process of the instant invention can be used in the widest range of fields such as, e.g., shoe manufacturing in order to produce polyurethane bottoms for any kind of shoe, innersoles, leggings, footwear and sandals; in the marine sector for producing the inner shells of ships, buoys, anti-slip carpets, handles and handrails; in road works to produce expansion joints, obstacles for reducing the speed of vehicles and removable buffers; in the car industry to produce bumpers, steering wheels, protective sumps and panellings; in the sector of technical articles to produce joints, suckers, gears, shock absorbers and protection gloves and in the furniture sector to produce furniture, frames, paving tiles and decorations.

We claim:

1. In a process for molding microcellular elastomeric polyurethane articles wherein reactants are brought together in a mixing head according to known methods, the improvement comprising:

reacting a first type quasi-polyurethane having a molecular weight of from 600 to 2200 and a free isocyanate group percent content of from 14 to 3.8, with at least one of a second type of quasi-polyurethane, having a molecular weight of from 3000 to 8000 and a free hydroxyl group percent content of from 1.13 to 0.48, and a glycol and optionally in the presence of water.

2. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a second type quasi-polyurethane having a molecular weight of from 3750 to 4500 and a free hydroxyl group percent content of from 0.9 to 0.75, and water.

3. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a second type quasi-polyurethane, having a molecular weight of from 3750 to 4500 and a free hydroxyl group percent content of from 0.9 to 0.75, a glycol and water.

4. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a second type quasi-polyurethane having a molecular weight of from 3750 to 4500 and a free hydroxy group percent content of from 0.9 to 0.75, with a glycol.

5. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a second type quasi-polyurethane having a molecular weight of from 3750 to 4500 and a free hydroxyl group percent content of from 0.9 to 0.75.

6. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a glycol and water.

7. A molding process according to claim 1, wherein said microcellular elastomeric polyurethane is made by reacting a first type quasi-polyurethane, having a molecular weight of from 700 to 1100 and a free isocyanate group percent content of from 12 to 7.6, with a glycol.

8. A molding process according to any one of claims 1 to 7, wherein said first type quasi-polyurethane, having a molecular weight of from 600 to 2200 and a free isocyanate group percent content of from 14 to 3.8, is made by reacting, according to known methods, a diphenylmethane diisocyanate with a saturated polyester having a molecular weight of from 1500 to 2500, in a molar ratio of 1:2.

9. A molding process according to any one of claims 1 to 7, wherein said first type quasi-polyurethane, having a molecular weight of from 600 to 2200 and a free isocyanate group percent content of from 14 to 3.8, is made by reacting, according to known methods, a diphenylmethane diisocyanate with a polyether having a molecular weight of from 1500 to 2500, in a molar ratio of 1:2.

* * * * *